(12) United States Patent
Lindgren

(10) Patent No.: US 6,671,997 B2
(45) Date of Patent: Jan. 6, 2004

(54) HEAVY MONOFILAMENT FISHING LINE

(76) Inventor: Peter B. Lindgren, 2499 SE. 8th St., Pompano Beach, FL (US) 33062

(*) Notice: Subject to any disclaimer, the term of this patent is extended or adjusted under 35 U.S.C. 154(b) by 0 days.

(21) Appl. No.: 10/165,919

(22) Filed: Jun. 11, 2002

(65) Prior Publication Data

US 2003/0226309 A1 Dec. 11, 2003

(51) Int. Cl.⁷ .................................................. A01K 91/00
(52) U.S. Cl. ..................................... 43/44.98; 43/7
(58) Field of Search ........................ 43/44.98, 7; 57/216

(56) References Cited

U.S. PATENT DOCUMENTS

| | | | | |
|---|---|---|---|---|
| 2,520,654 A | * | 8/1950 | Rants | 43/44.89 |
| 3,334,436 A | * | 8/1967 | Cole, Jr. | 43/44.98 |
| 3,849,929 A | * | 11/1974 | Martuch | 43/44.98 |
| 3,914,480 A | * | 10/1975 | Lang | 428/395 |
| 3,922,809 A | * | 12/1975 | Platou | 43/7 |
| 4,330,956 A | * | 5/1982 | McCarthy | 43/4 |
| 4,779,372 A | * | 10/1988 | Pozo Obeso | 43/44.98 |
| 4,952,344 A | * | 8/1990 | Burgess | 264/40.1 |
| 5,131,218 A | | 7/1992 | Berger | |
| 5,296,292 A | * | 3/1994 | Butters | 428/375 |
| 6,569,381 B2 | * | 5/2003 | Le Floc'h et al. | 419/67 |

FOREIGN PATENT DOCUMENTS

| | | | | | |
|---|---|---|---|---|---|
| GB | 2048631 A | * | 12/1980 | ......... | A01K/95/00 |
| JP | 2000069891 A | * | 3/2000 | ......... | A01K/95/00 |

* cited by examiner

*Primary Examiner*—Peter M. Poon
*Assistant Examiner*—Joan M. Olszewski
(74) *Attorney, Agent, or Firm*—McHale & Slavin, P.A.

(57) ABSTRACT

A heavy fishing line useful in fishing to reduce the environmental impact on marine birds has a high specific gravity and a high sink rate in water. The composite line has a central core of heavy metal and metal salt particles surrounded by a polymeric monofilament for use in long line fishing as well as fish nets.

10 Claims, 2 Drawing Sheets

HEAVY MONOFILAMENT FISHING LINE

FIELD OF THE INVENTION

This invention relates to the field of fishing and more specifically to an improvement in the fishing line used in long line fishing.

BACKGROUND OF THE INVENTION

Long line fishing is a profession that employs miles of rope, cable or monofilament line deployed along the depths of an ocean for demersal species or supported horizontally in the water column from floats with hundreds or, even thousands, of hooks for palegic species.

Originally these long lines were made from rope set and hauled, by hand, from small boats. Pincher type power driven haulers made larger systems feasible for larger vessels wherein the rope was usually stored in large tubs. Later, some mid-size boat fleets found it preferable to haul and store rope lines on large hydraulic driven reels eliminating the need for a pincher hauler and the storage tubs.

In the 1970's, some fishermen started using large monofilament for the main lines instead of ropes. They found that it fished better. Monofilament long lining systems expanded steadily for the mid-sized fleets of boats 12 to 30 meters in length.

In the late 1990's, monofilament long line gear was beginning to penetrate more demanding markets of larger boats. These boats, up to 60 meters, have large crews and can set and haul up to 70 or 80 miles per day.

Some activists and environmental groups have expressed concerns about long line fishing because of the accidental harvesting of protected or endangered species of fish and mammals. Also, birds, such as the endangered Pacific albatross and others, are attracted to the bait deployed along the line. As conventional line is unreeled behind the boats with baited hooks, the line and the bait tend to remain on or near the surface for a period of time before submerging. Unfortunately in trying to eat the bait, some of the birds become fatally entangled with the line or hooks.

The fishing industry has responded to these concerns by using different techniques and equipment to lessen the environmental impact of long line fishing. Line setting devices deploy the line slack so that it can sink faster or use a underwater chute to deploy the baited hooks several meters below the surface before they are exposed. These techniques require additional expense and effort on the part of the fisherman and vessel.

The properties of highly molecularly oriented Nylon lines in current usage, such as Nylon 6-6/6 copolymer monofilament 3.6 mm line test at over 1200 lb. tensile strength and has a specific gravity of about 1.12 to 1.13. The line sinks slowly in salt water which has a specific gravity of about 1.027. Thus, the line and bait may lay on the surface of the water for a period of time wherein the birds can feast on the bait with the resulting consequences.

What is needed in the art is a fishing line with conventional properties of strength, elongation creep, wear and flexibility that will submerge quickly to reduce the time bait remains on or near the surface of the water. Heavy monofilament could replace or compliment current methods to reduce bird catch.

DESCRIPTION OF THE PRIOR ART

U.S. Pat. No. 5,131,218 to Berger discloses a fishing rope with floating and sinking portions. The rope is made up of filaments formed into a portion that has a specific gravity less than 1 and a portion of the rope has a specific gravity greater than 1.

The Burgess patent, U.S. Pat. No. 4,952,344, discloses a fly fishing line with a nylon or Kevlar core pulled through an extruder and coated with other polymers, such as polyurethane. The coating may have a filler to increase density. The fillers may be pulverized lead, barium sulfate, or tungsten and may be added to result in a specific gravity of 2 or more. The density of the line may be changed along its length from a floating line to a sinking line.

Matsumoto et al, U.S. Pat. No. 3,808,725, discloses a fishing net with a high specific gravity made with hollow monofilaments with a core of spaced apart fiber segments of metal or metal alloys. A specific gravity of 2.9 was obtained in one example. The monofilaments were produced by simultaneously extruding a core and a polymeric covering.

SUMMARY OF THE INVENTION

This invention is a composite heavy fishing line for reducing environmental damage defined as an indefinite running length of flexible polymeric monofilament material containing a mixture of particulate metals and/or salts thereof, such as copper, brass or tungsten as a heavy metal and silicon carbide or barium sulfate as a salt. There are several other metals with acceptable properties of weight and price. Some of the most suitable are too expensive like gold, Platinum and silver. Others are unsuitable because of environmental reasons for example mercury, uranium, and potentially lead. Any heavy affordable powdered material could be used. Materials with a specific gravity of as low as 2.0 could be used in higher quantities, however, monofilament properties will suffer compared to lower amounts of a higher specific gravity material like tungsten with a specific gravity of 19. The selection and amount of material depends on the sink rate required, the physical properties and the cost limitaions.

| Material | Sp. Gr. |
| --- | --- |
| Glass common | 2.4–2.8 |
| Glass Crystal | 2.9–3.0 |
| Aluminum | 2.5–2.8 |
| Barium Sulfate | 4.3 |
| Lead ore | 7.3–7.6 |
| Lead | 11.3 |
| Mercury | 13.5 |
| Steel | 7.8 |
| Iron | 7.3 |
| Copper | 8.8 |

The mixture is added to the core of the line wherein the improved fishing line has a specific gravity over 1.15 and rapidly sinks in water to prevent birds from becoming entangled with said fishing line.

Such a line fishes better than conventional lines. The demersal fishermen prefer such a heavy line that sinks faster and moves less on the bottom. The palegic fishermen prefer a heavy line that descends steeply between floats and is less disturbed by underwater currents.

The line may be used in making nets wherein the properties of the net repeat those of currently weighted nets. However, nets made in accordance with the instant invention will sink when untended thereby lessening the environmental impact caused by lost nets. For instance, an edge of a conventional trawler net floats on the water surface while the majority of the net is submerged. If the net is lost, due to rigging failure, high seas, or the like, the net will continue to float where it can snare marine life. Further, such a net may eventually wash on shore where it can drag across and foul coral reefs. The use of the instant invention would eliminate the need for heavy weights for a lower edge and buoyancy keepers. Thus, the overall weight of the net is reduced wherein a negative buoyancy can be obtained without exceeding vessel rigging capacities.

Also disclosed is a methods of making composite heavy fishing lines for rapid submersion comprising the steps of 1) preparing an extrusion compound of polymeric material;
2) passing said material to an extruder;
3) metering said particles to said extruder; and
4) extruding an indefinite length composite line with a specific gravity of at least 1.15.

Copper powder with a specific gravity of 8.8 was added to a nylon 6/6—6 copolymer fish line of 2.0 mm with the following results.

| % Cu By Wt. | Sink Rate Ft./Sec. | Tensile Test Lbs. F | Knot Test Lbs. F |
|---|---|---|---|
| 0 | .23 | 470 | 280 |
| 5 | .27 | 349 | 174 |
| 10 | .31 | 320 | 167 |
| 15 | .36 | 227 | 150 |

It is clear that by simply adding heavy material in the polymer while forming the line the sink rate can be increased, but with significant loss in physical properties. Improvements can be made by using higher specific gravity materials such as tungsten instead of copper, but with a increase in cost. This method may be useful for some applications, but the most demanding applications must be accomplished without the significant losses in strength.

Accordingly, it is an objective of the instant invention to teach a method of making a composite fishing line by co-extrusion of a core of heavier particles and a polymeric cover capable of use in long line fishing that will submerge quickly upon contact with the water.

It is another objective of the instant invention to teach a method of combining the heavier particles as an aggregate slurry for continuous co-extrusion with a polymeric material.

It is a further objective of the instant invention to teach a composite fishing line of indefinite length composed of a continuous polymer with a core of metal particles having a specific gravity of about 1.4. without significant losses in physical properties.

It is yet another objective of the instant invention to teach an indefinite length fishing line of polymeric material with about 10% by volume of metal particles.

Still another objective of the instant invention to teach the use of a fishing line having sinking properties that cannot be disabled by an operator.

It is yet another objective of the instant invention to teach the use of a fishing line that allows authored to instantly recognize whether a fishing boat is conforming to the fishing line sinking requirements, wherein the fishing line cannot be hidden and is of such size that substitution is not possible.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The fishing line 10 is continuously extruded in indefinite lengths in a diameter of from about 2.0 mm to 3.6 mm. The molecularly oriented monofilament 12 is nylon or a nylon copolymer. Other polymers having similar properties may be utilized in this line.

Figure 1:
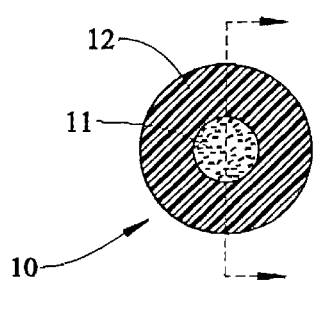
FIG. 1 is a cross section of a fishing line of this invention.
Figure 2:
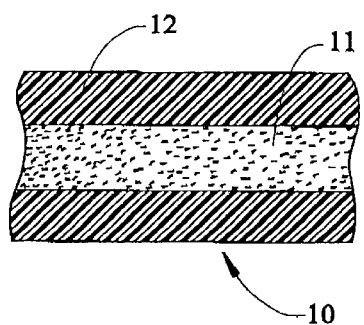
FIG. 2 is a cross section of FIG. 1 along line 2—2.

Under normal conditions, the long line is deployed from a reel on the stern of a boat. When the line is near neutral buoyancy, a considerable amount of baited hooks may be exposed on or near the surface of the water. In order to reduce the amount of bait exposed and thereby reduce the possibility of ensnaring any predatory birds, a line with negative buoyancy is preferred. In the preferred embodiment, illustrated in FIGS. 1 and 2, the line 10 has negative buoyancy resulting from the continuous central core 11 of heavy metals or heavy metals and/or salts. To provide the necessary properties for long line fishing, the core 11 is sheathed in the monofilament 12. The composite line is uniformly co-extruded as an integral whole.

Figure 3:
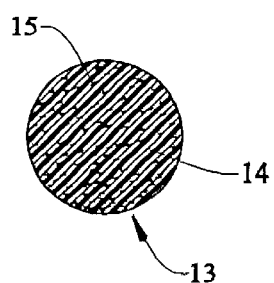
FIG. 3 is a cross section of another fishing line of this invention.

Another embodiment is a line 13, shown in FIG. 3, that is extruded as a uniform composite of polymer 14 and heavy powder 15. This line is the product of a method in which the heavy powder and polymer are mixed in the hopper of the spinneret, as shown in FIG. 5.

Figure 5:
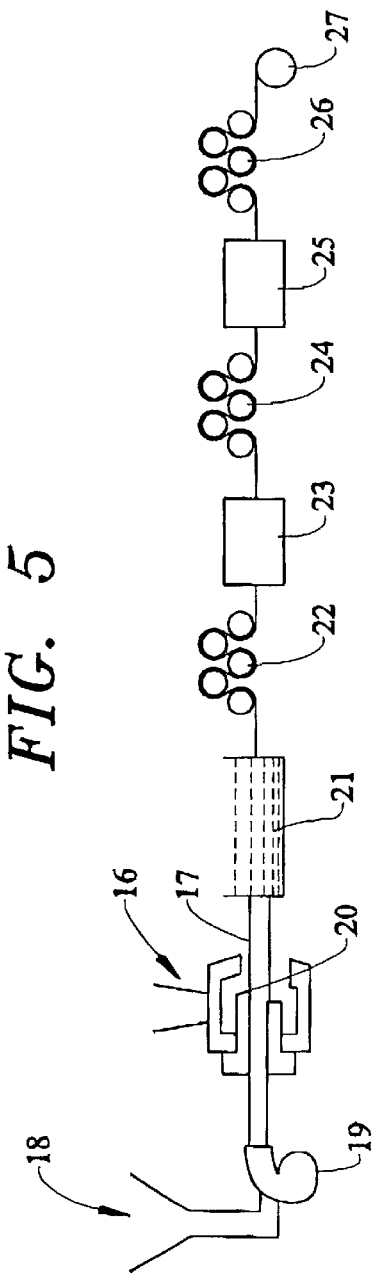
FIG. 5 is a schematic of the method steps of this invention.

As illustrated in FIG. 5 the monofilament composition is fed into an extruder 16 having a coaxial outer spinneret 17. A blended slurry of heavy metals or salts is introduced to the reservoir with a coaxial inner outlet 20. The slurry is uniformly fed to the outlet by pump 19 to form a core having high specific gravity. As the composition is pulled, by puller 22, from the extruder into a bath 21, a composite monofilament is formed having a monofilament outer layer encircling a particulate core 11, The composite monofilament is pulled into an oven 23 for orienting the polymer and heat treatment by puller 24 then pulled into another oven 25 for further orientation and finishing or setting by puller 26. The finished line is taken up on a winder or spool 27.

The slurry may be formed of metal powder suspended in a liquid in such proportions to obtain an even dispersion in the core. The metal powders preferred are of copper, brass or tungsten though other high density metals may be used. To avoid problems of uneven density in the line caused by voids in the core or separation of the components of the slurry before extrusion, it has been found that different particle sized metals or metal salts form an aggregate in a the liquid. Such a slurry with an aggregate of different sized particles can be evenly introduced into the extrusion by metering pumps. A preferred slurry is made up of 4 parts, by volume, copper powder and 1 part barium sulfate suspended in mineral oil, vegetable oil, or the like or any other carrier that allows for the forming of a slurry for insertion of the metals and/or salts. Preferably the oil is biodegradable. The slurry is injected into the extrusion at about 10% to about 15%, by volume, and results in a composite monofilament line with a specific gravity of about 1.4. This dramatically increases the weight of the line in water and dramatically increases the sink rate. Using tungsten powder, for example, produces a line with much higher specific gravity and sink rate. 3.6 mm monofilament was extruded with and without a copper slurry of 10% and 15% with the following results.

| % | Tensile strength | Knot Strength |
| --- | --- | --- |
| 0 | 1285 lbs. | 686 lbs. |
| 10 | 1246 | 641 |
| 15 | 1046 | 513 |

The line produced with the heavy slurry into the center of the monofilament retained physical properties substantially better than monofilament made with the heavy additives mixed throughout the polymer matrix. This monofilament is suitable for the most demanding fishing applications and allows for a much higher amount of additives to achieve higher specific gravity and sinking rates.

Figure 6:
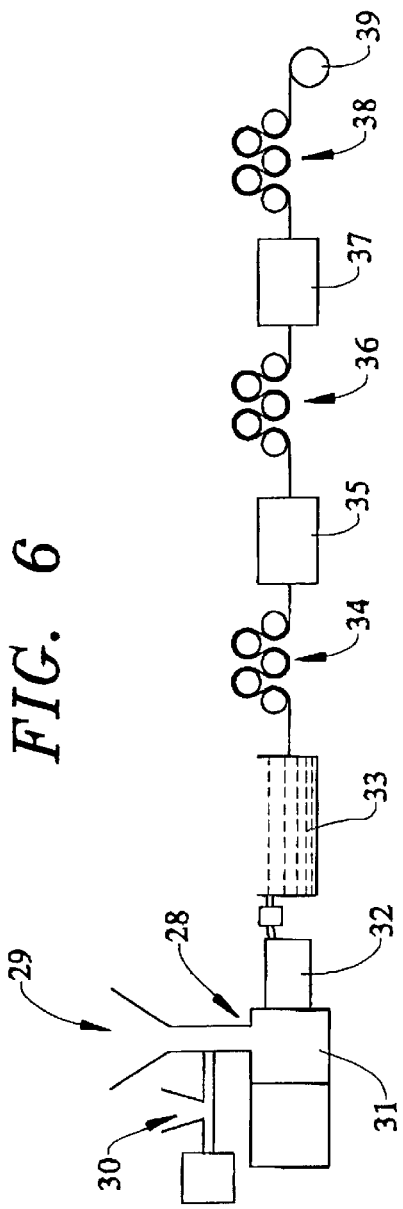
FIG. 6 is a schematic of other method steps of this invention.

FIG. 6 shows an extruder 28 having a hopper 29 for the polymer and a secondary hopper 30 for the slurry of heavy particulate material. The polymer and particulate slurry are mixed in the mixer 31 and fed to the spinneret 32. A composite monofilament issues from the spinneret into the water bath 33. Puller 34 extracts the line from the bath and adds molecular orientation to the line. Ovens 35 and 37 provide heat treatment and are fed by pullers 36 and 38. The finished line is spooled on roller 39.

Figure 4:
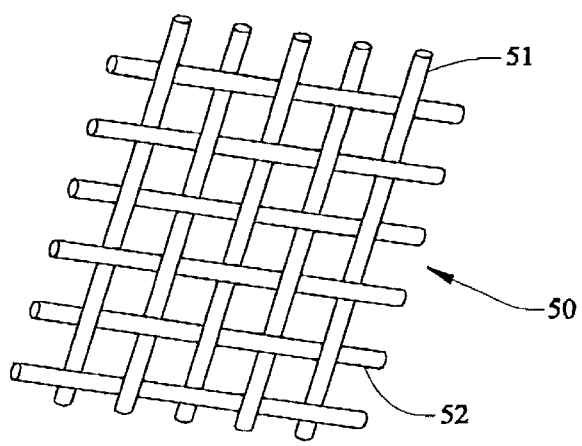
FIG. 4 is an illustration of a net woven from the fishing line of the invention.

The line may be used in making nets for use in lessening the environmental impact caused by lost nets FIG. 4 illustrates a net 50 formed from fishing lines 51 and 52 produced in accordance with the invention. Line used in making of nets reduced the overweight of a net by eliminating the need for independent weights with counter balancing buoyance floats. If the net is lost, due to rigging failure, high seas, or the like, the net sink eliminating the possibility of entangling wandering marine life or corral. The overall weight of the net is reduced by use of the instant weighted line wherein a negative buoyancy can be obtained without exceeding vessel rigging capacities.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A composite heavy fishing line for reducing environmental impact comprising an indefinite running length of flexible polymeric monofilament material surrounding a core, said core containing a mixture of a heavy particulate materials whereby said fishing line has a specific gravity of greater than 1.14 and rapidly sinks in water.

2. A composite heavy fishing line of claim 1 wherein said mixture is approximately 5 per cent by volume of said heavy fishing line.

3. A composite heavy fishing line of claim 1 wherein said mixture is approximately 10 per cent by volume of said heavy fishing line.

4. A composite heavy fishing line of claim 1 wherein said mixture is approximately 20 per cent by volume.

5. A composite heavy fishing Line of claim 1 wherein said mixture is a heavy slurry or heavy materials in suspension.

6. A composite heavy fishing line of claim 1 wherein said mixture is over 5 per cent by volume of said fishing line.

7. A composite heavy fishing line of claim 1 wherein said monofilament is fabricated into a fishing net.

8. A composite line for nets for use in reducing environmental impact comprising an indefinite running length of flexible polymeric monofilament material surrounding a core, said core containing a mixture of a heavy particulate materials whereby at least a portion of said composite line has a specific gravity of greater than 1.14.

9. A composite line of claim 8 wherein said mixture is approximately 5 per cent by volume of said line.

10. A composite heavy fishing line of claim 8 wherein said mixture is over 5 per cent by volume of said line.

* * * * *